(12) United States Patent
Ng et al.

(10) Patent No.: US 8,939,569 B2
(45) Date of Patent: Jan. 27, 2015

(54) INKJET INK WITH NON-SWELLABLE LATEX PARTICLES

(71) Applicant: Hewlett-Packard Development Company, L.P., Fort Collins, CO (US)

(72) Inventors: Hou T. Ng, Campbell, CA (US); Sivapackia Ganapathiappan, Los Altos, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 225 days.

(21) Appl. No.: 13/645,143

(22) Filed: Oct. 4, 2012

(65) Prior Publication Data

US 2014/0098164 A1 Apr. 10, 2014

(51) Int. Cl.
*B41J 2/01* (2006.01)
*B41J 2/21* (2006.01)
*C09D 11/30* (2014.01)
*B41J 11/00* (2006.01)
*B41J 2/005* (2006.01)

(52) U.S. Cl.
CPC ............... *B41J 2/2107* (2013.01); *C09D 11/30* (2013.01); *B41J 11/002* (2013.01); *B41J 2/0057* (2013.01)
USPC .............. 347/100; 347/95; 347/102; 347/103

(58) Field of Classification Search
CPC .......... B41J 2/01; B41J 2/2107; B41J 2/0057; B41J 11/002; B41J 11/0015; C09D 11/00; C09D 11/30; C09D 11/322; C09D 11/40; C09D 11/52; B41M 5/0047; B41M 7/009

USPC .......... 347/95–105; 523/160, 161; 106/31.13, 106/31.27, 31.6
See application file for complete search history.

(56) References Cited

U.S. PATENT DOCUMENTS

| | | |
|---|---|---|
| 4,241,159 A | 12/1980 | Priem et al. |
| 4,762,764 A | 8/1988 | Ng et al. |
| 5,437,953 A | 8/1995 | Russell et al. |
| 6,133,341 A | 10/2000 | Kato |
| 6,174,936 B1 | 1/2001 | Kato |
| 6,184,267 B1 | 2/2001 | Kato et al. |
| 6,357,870 B1 | 3/2002 | Beach et al. |
| 2002/0156156 A1 | 10/2002 | Gore |

(Continued)

FOREIGN PATENT DOCUMENTS

| | | |
|---|---|---|
| WO | WO 2009/014855 | 1/2009 |
| WO | WO 2009/151446 | 12/2009 |
| WO | WO 2010/120278 | 10/2010 |

OTHER PUBLICATIONS

MSDS Divinyl benzene, May 21, 2013.*

(Continued)

*Primary Examiner* — Matthew Luu
*Assistant Examiner* — Rut Patel

(57) ABSTRACT

An inkjet ink includes a non-polar carrier, a colorant dispersed in the non-polar carrier, a dispersant, and non-swellable latex particles of a cross-linked polymer dispersed in the non-polar carrier. The colorant is chosen from a pigment, a dye, or a combination of a pigment and a dye. The cross-linked polymer consists of: an acrylic monomer having a molecular weight less than 1000, a vinylic monomer having a molecular weight of less than 1000, or combinations thereof.

20 Claims, 2 Drawing Sheets

(56) References Cited

U.S. PATENT DOCUMENTS

| | | | |
|---|---|---|---|
| 2004/0165050 A1* | 8/2004 | Horie et al. | 347/100 |
| 2009/0162779 A1 | 6/2009 | Nair et al. | |
| 2011/0200817 A1 | 8/2011 | Duckworth | |
| 2011/0242167 A1 | 10/2011 | Crum | |
| 2012/0140008 A1* | 6/2012 | Ganapathiappan et al. | 347/102 |
| 2013/0183619 A1* | 7/2013 | Ganapathiappan et al. | 430/115 |

OTHER PUBLICATIONS

MSDS Methyl Methacrylate, May 21, 2013.*

"Digital Printing Technologies, the Role of Liquid Toner, and Xeikon's Technology Expansion", Market Commentary, Apr. 2012, 6 pgs., www.it-strategies.com.

* cited by examiner

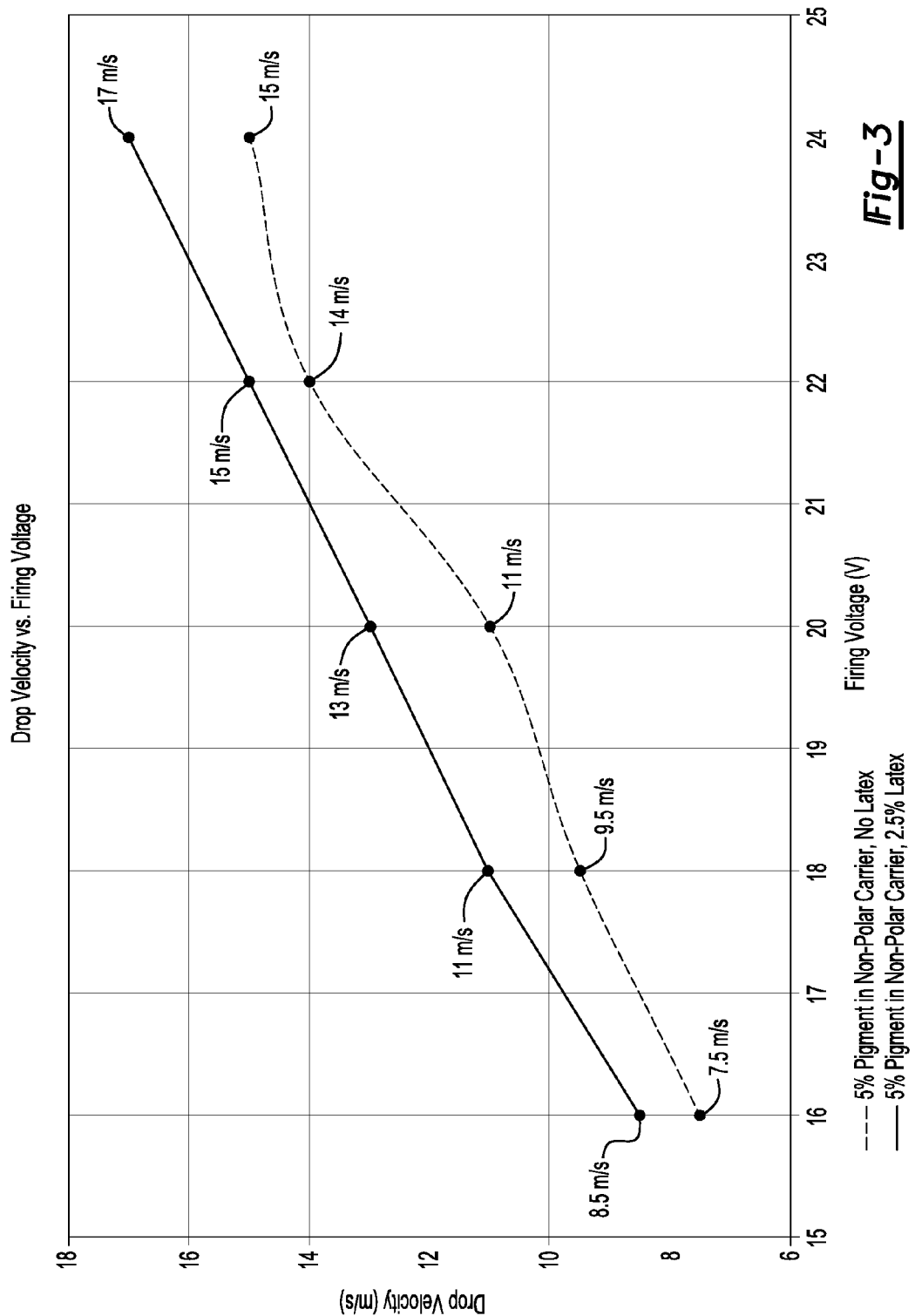

INKJET INK WITH NON-SWELLABLE LATEX PARTICLES

BACKGROUND

The global print market is in the process of transforming from analog printing to digital printing. Digital printing involves printing from a digital based image to a variety of media. Inkjet printing and electrophotographic printing are examples of digital printing techniques. These printing techniques have become increasingly popular for printing photographs and/or decorative art items.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a graph depicting drop velocity versus firing voltage for an example of the inkjet ink disclosed herein and a comparative inkjet ink.

DETAILED DESCRIPTION

Figure 1:
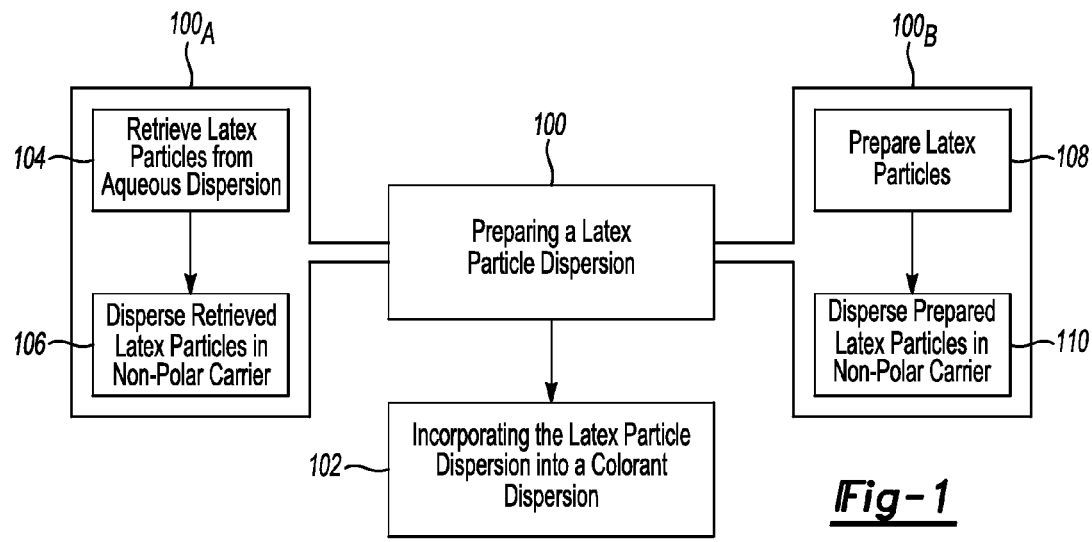
FIG. 1 is a flow diagram illustrating an example of a method for making an example of an inkjet ink.

The present disclosure relates generally to inkjet inks including non-swellable latex particles. Each non-swellable latex particle is a cross-linked polymer of an acrylic monomer and/or a vinylic monomer. Each acrylic and/or vinylic monomer used to form the cross-linked polymer has a molecular weight less than 1000. Larger monomers and/or resins (e.g., random copolymers) that are soluble in the non-polar carrier are not copolymerized with the acrylic and/or vinylic monomer having the molecular weight less than 1000. The particular monomers disclosed herein are capable of polymerizing and cross-linking to form the non-swellable latex particles, which are dispersible and substantially insoluble (i.e., solubility of less than 1%) in the selected non-polar carrier. In an example, the non-swellable latex particles are completely non-soluble in the selected non-polar carrier. Cross-linked latex particles are generally more rigid than latex particles formed with linear, non-cross-linked polymers. Rigid particles facilitate good jettability and long-term dispersion stabilization.

By "non-swellable", it is meant that the latex particles experience uptake of the non-polar carrier to an extent that the viscosity of the inkjet ink and the size of the latex particles are not substantially affected when the latex particles are added to the non-polar carrier. In other words, the cross-linked polymer matrix traps an amount of the non-polar carrier therein that is insufficient to swell the latex particles to the point of rendering them part of the non-polar carrier. In some instances, the non-swellable latex particles do not take on any of the non-polar carrier, and thus the viscosity and the particle size do not change. In other instances, the amount of non-polar carrier uptake is so small that the viscosity and/or particle size changes by equal to or less than 5% (i.e., % change in viscosity and/or particle size is from 0% to 5%). As such, the addition of the non-swellable, latex particles to the inkjet ink does not result in the formation of a soft gel, and thus the inkjet ink is readily jettable via a piezoelectric pen or printhead. The non-swellable latex particles disclosed herein are in contrast, for example, to polyethylene-based particles, which may swell in the non-polar carrier to the point of becoming part of the non-polar carrier. The swelling of polyethylene-based particles may be due, at least in part, to the molecular structure similarity between the polyethylene-based particles and the non-polar carrier.

The non-swellable latex particles disclosed herein do not agglomerate or aggregate over time, which reduces sedimentation in the inkjet inks. As a result, the inkjet inks formed with the non-swellable latex particles disclosed herein are stable. The lack of agglomeration or aggregation is achieved without the addition of a copolymer resin (to the latex particle) that is soluble or even partially soluble in the non-polar carrier.

Additionally, it is believed that images produced by the examples of the inkjet ink exhibit desirable image quality. This may be due, at least in part, to the small particle size (e.g., from about 50 nm to about 500 nm) of the non-swellable latex particles in the inkjet ink. The smaller particles improve edge acuity as well as resolution of the printed image. In the final printed image, the latex particles also hold the colorants in place and close to the outermost surface of the substrate. It is also believed that the printed images formed from the inkjet ink disclosed herein exhibit enhanced durability and scratch resistance due, at least in part, to the acrylic and/or vinylic monomer used to form the cross-linked polymer latex particles and to the fusing utilized in an example of the printing method.

As mentioned above, the inkjet ink disclosed herein is printable via a piezoelectric pen or printhead. As such, any digital printer utilizing piezoelectric technology may be used to print the inkjet ink. In an example, the inkjet ink is printed using a hybrid printing technique, which incorporates some aspects of inkjet printing and some aspects of transfer printing. This example will be described further hereinbelow in reference to FIG. 2.

Examples of the inkjet ink disclosed herein include the previously mentioned non-polar carrier, the previously mentioned non-swellable latex particles, a colorant, and a dispersant. The composition of the inkjet ink will be described further in reference to FIG. 1, which illustrates an example of a method for forming the inkjet ink. As shown in FIG. 1, the inkjet ink may be formed by preparing a latex particle dispersion (reference numeral 100) and then incorporating the latex particle dispersion into a colorant dispersion (reference numeral 102).

Preparation of the latex particle dispersion may be accomplished in a variety of ways. In some examples, commercially available latex particles (that have been removed from water) are added to the non-polar carrier and a dispersant to form the latex particle dispersion (e.g., reference numeral 100$_A$ in FIG. 1); and in other examples, the latex particles are prepared in water and removed from water, and then are added to the non-polar carrier and a dispersant to form the latex particle dispersion (e.g., reference numeral 100$_B$ in FIG. 1).

Whether the non-swellable latex particles are commercially available or are prepared using the method(s) disclosed herein, the latex particles are cross-linked polymer particles formed from polymerized and cross-linked monomers. These monomers consist of: an acrylic monomer having a molecular weight of less than 1000, a vinylic monomer having a molecular weight of less than 1000, or combinations of the acrylic monomer and the vinylic monomer. Examples of suitable acrylic monomers include alkyl acrylates, alkyl methacrylates, and monomers including more than one polymerizable acrylic group. Some specific examples of acrylic monomers are methyl methacrylate, butyl acrylate, butyl methacrylate, hexyl acrylate, hexyl methacrylate, 2-ethylhexyl acrylate, 2-ethylhexyl methacrylate, lauryl acrylate, lauryl methacrylate, stearyl methacrylate, acrylic acid, methacrylic acid, ethylene glycol dimethacrylate, pentaerythritol tri-acrylate, pentaerythritol tetra-acrylate, pentaaerylthritol tri-methacrylate, pentaerythritol tetra-methacrylate, acrylonitrile, methacrylonitrile, or combinations thereof. Some of the listed acrylic monomers (e.g., alkyl acrylates and alkyl methacrylates) also include vinyl groups. Examples of vinylic monomers include styrene, substituted styrene, and monomers including more than one polymerizable vinylic group. Some specific examples of suitable vinylic monomers are divinylbenzene, chloromethyl styrene, and methylstyrene.

The resulting latex particles each have a molecular weight ranging from about 50,000 to about 1,000,000.

The non-swellable latex particles are relatively rigid, having a glass transition temperature ($T_g$) ranging from greater than 45° C. to about 120° C. In an example, the $T_g$ ranges from about 60° C. to about 120° C. The high $T_g$ minimizes inter-particle interaction, and thus discrete, non-agglomerated/aggregated latex particles may be maintained during printing, which enhances printability. In contrast, it is believed that at a lower $T_g$ (e.g., at 45° C. or lower, such as at 20° C.), printability is deleteriously affected at least because of inter-particle interaction.

The $T_g$ of the non-swellable latex particles may be adjusted by altering the monomers used to form the latex particles. If more than one monomer (e.g., multiple acrylic or vinylic monomers or a mixture of the acrylic monomer and the vinylic monomer) is used to produce the latex particles, then the $T_g$ of the polymerized and cross-linked latex particles may be estimated using the Fox equation (Equation 1 below). The Fox equation may be used to relate the weight fractions of a polymer system to the glass transition temperature:

$$\frac{1}{T_g} = \frac{w_1}{T_{g1}} + \frac{w_2}{T_{g2}}$$ (Equation 1)

where $w_1$ and $w_2$ are the weight fractions of copolymers 1 and 2, respectively, and $T_{g1}$ and $T_{g2}$ are the glass transition temperatures of the copolymers 1 and 2, respectively. Generally, the $T_g$ of the copolymer is affected by the $T_g$ of the homopolymers in the polymer system.

As mentioned above, one example of the latex particle dispersion includes commercially available latex particles. Some examples of commercially available latex particles that have the desirable cross-linked polymer matrix include styrene acrylic latex particles of the RAYREZ™ family (e.g., RAYREZ™ 182A, RAYREZ™ 182D, and RAYREZ™ 200) and of the RAYKOTE™ family (e.g., RAYKOTE™ 1589), all of which are available from Specialty Polymers, Inc., Chester, S.C.

Reference numeral $100_A$ in FIG. 1 illustrates an example of a method for forming the latex particle dispersion using commercially available latex particles. These particles are often available in the form of an aqueous dispersion. In this example, the method includes removing the water of the aqueous dispersion to retrieve the non-swellable latex particles (reference numeral 104). Any suitable technique may be used to remove the water, including forced air circulation, freeze-drying, or the like.

Once the non-swellable latex particles are retrieved, the non-swellable latex particles are dispersed into the non-polar carrier, as shown at reference numeral 106. This may be accomplished by adding the retrieved non-swellable latex particles and a suitable amount of a dispersant to the selected non-polar carrier, and mixing the various components.

In the examples disclosed herein, the non-polar carrier exhibits properties such as low odor, lack of color, selective solvency, oxidation stability, low electrical conductivity, low surface tension, desirable wetting, spreadability, low viscosity, narrow boiling point range, non-corrosive to metals, low freezing point, high electrical resistivity, high interfacial tension, low latent heat of vaporization, and low photochemical reactivity. Further, the carrier is selected to have a low field conductivity (e.g., less than 200 pS/cm) so that it does not increase the final conductivity of the inkjet ink.

In an example, the non-polar carrier may be chosen from hydrocarbon-based carriers, such as aliphatic (linear/acyclic or cyclic) hydrocarbons, branched-chain aliphatic hydrocarbons, etc. Examples of suitable hydrocarbon carriers include isoparaffinic hydrocarbons, such as ISOPAR® L or ISOPAR® V available from Exxon Mobile, Houston, Tex. In another example, the non-polar carrier is an oil, such as silicone oil, soy bean oil, vegetable oil, plant extracts, and/or the like. It is to be understood that a single hydrocarbon carrier or a combination of hydrocarbon carriers may be used, that a single oil or a combination of oils may be used, or that a combination of hydrocarbon(s) and oil(s) may be used.

The dispersant selected for the latex particle dispersion is at least partially soluble in the non-polar carrier. In some instances, the dispersant itself may include from about 20 wt % to about 80 wt % of the non-polar carrier (or another heavy oil). In an example, the dispersant(s) may be selected from anionic dispersants, cationic dispersants, amphoteric dispersants, non-ionic dispersants, polymeric dispersants, oligomeric dispersants, crosslinking dispersants, or combinations thereof. Examples of anionic dispersants include sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and dioctyl sodium sulfosuccinate (i.e., docusate sodium, DSS, Aerosol OT). Examples of cationic dispersants include quaternary amine polymers, protonated amine polymers, or polymers containing ammonium (such as those that are available from Lubrizol Corp., Wickliffe, Ohio). Further examples of cationic dispersants include SOLSPERSE® 2155, 9000, 13650, 13940, and 19000 (Lubrizol Corp.) and other like cationic dispersants. Amphoteric dispersants include those containing compounds having protonizable groups and/or ionizable acid groups. An example of a suitable amphoteric dispersant is lecithin. Examples of non-ionic dispersants include oil-soluble polyesters, polyamines, polyacrylates, polymethacrylates (such as, e.g., SOLSPERSE® 3000 (Lubrizol Corp.), SOLSPERSE® 21000 (Lubrizol Corp.), or the like). Examples of oligomeric dispersants include low average molecular weight (i.e., less than 1000) non-ionic dispersants. Examples of cross-linking dispersants include, but are not limited to, polymers or oligomers containing two or more carbon double bonds (C=C) and free amine groups such as, e.g., polyamines, crosslinkable polyurethanes, and divinyl benzene. Other suitable dispersants include OS#13309AP, OS#13309AQ, 14179BL, and 45479AB from Lubrizol Corp, which are dispersants based on polyisobutylene succinic acid with polyethyleneimines. These dispersants are combination polymers that are cationic in nature. Still other suitable dispersants include biodegradable polymer dispersants, such as CERAFLOUR® 1000 (BYK Gardner USA, Columbia, Md.), or inorganic dispersants, such as NANOBYK® 3605 (BYK Gardner).

Still referring to reference numeral 106 in FIG. 1, the retrieved non-swellable latex particles, the dispersant, and the non-polar carrier may be mixed using ball milling, which involves shaking or milling the components in the presence of beads, jar milling, microfluidization, or high shear mixing without grinding. When ball milling is utilized and after mixing is accomplished for a suitable amount of time, the beads are removed and the latex particle dispersion is prepared.

Reference numeral $100_B$ in FIG. 1 illustrates an example of a method for forming the latex particle dispersion which includes first preparing (i.e., making, synthesizing, etc.) the non-swellable latex particles (as shown at reference numeral 108). The latex particles may be prepared by forming an emulsion of the previously described acrylic monomer and/or the vinylic monomer in water or in a combination of water and surfactant. The surfactant may be an anionic surfactant, such as MAXEMUL™ 6106 available from Croda Inc. (Edison, N.J.) or the like. Emulsification of the monomers in water (or in water and surfactant) to form the latex particles may be accomplished using any emulsion-based process. Examples of the emulsion-based process include a mini-emulsion process and a reduction-oxidation (i.e., redox) polymerization process.

When preparing the latex particles, any of the previously mentioned monomers may be used, alone or in combination. Two specific examples of monomer combinations include i) styrene, butyl acrylate, methacrylonitrile, ethylene glycol dimethacrylate, and methacrylic acid, and ii) styrene, butyl acrylate, ethylene glycol dimethacrylate, and methacrylic acid.

During the preparation of the non-swellable latex particles, an initiator solution is utilized in combination with the emulsion. The initiator solution includes an initiator dissolved in water. The initiator may be a free-radical initiator, such as azo compounds and organic peroxides, or a reduction-oxidation (i.e., redox) initiator, such as a persulfate salt (e.g., potassium persulfate and ammonium persulfate). In an example, about 2.5 g of initiator is added for about every 130 ml of water. It is to be understood, however, that the amount of initiator may vary depending, at least in part, on the monomer composition in the emulsion. In an example, the amount of initiator in the initiator solution ranges from about 0.2 wt % to about 2.5 wt % with respect to the total amount of monomers in the emulsion.

The initiator solution and the emulsion are added to water to form a reaction mixture. The water may be used alone or in combination with a small amount of the initiator used in the initiator solution. In an example, about 0.6 g of the initiator is added to about 1160 ml of water. The water that receives the initiator solution and the emulsion may be at a temperature ranging from about 20° C. to about 95° C. In an example, the water is heated to about 90° C.

In an example, the reaction mixture is formed by simultaneously adding the initiator solution and the emulsion to the water. The simultaneous addition may be accomplished over a period of time while mixing (at a constant or varying speed) occurs. This may contribute to obtaining a more homogeneous reaction mixture.

The reaction mixture is maintained at a predetermined temperature for a predetermined time in order to achieve polymerization and cross-linking of the monomer(s) in the emulsion. The predetermined temperature may be anywhere from ambient temperature (e.g., about 20° C.) to about 95° C., and will depend, at least in part, upon the monomer(s) utilized. The reaction mixture may also be continuously mixed while polymerization and cross-linking are allowed to occur. After polymerization and cross-linking are complete (which may occur, e.g., after about 2 hours from when the emulsion is added to the water), the final reaction product is cooled, e.g., to ambient temperature. The final reaction product includes at least water and the cross-linked polymer latex particles (i.e., the non-swellable latex particles).

The pH of the final reaction product may be adjusted to a value ranging from about 5 to about 9 utilizing a suitable pH adjuster. In some examples, the pH is adjusted to a value ranging from 5 to 8.5. If, for instance, the final reaction product is acidic, then a 50% potassium hydroxide solution may be used to adjust the pH to about 7.

The final reaction product may be filtered using, e.g., a mesh filter to obtain the non-swellable latex particles in water having about 20% solids content. Thereafter, the non-swellable latex particles are separated from the water by forced air circulation, freeze-drying, or another like technique. The resulting non-swellable latex particles have an individual particle size (in terms of effective diameter, assuming that each particle may not be perfectly spherical) ranging from about 50 nm to about 500 nm, and thus are jettable from a piezoelectric inkjet pen.

As shown at reference numeral 110 of the method $100_B$, the prepared non-swellable latex particles are then dispersed into the non-polar carrier to form the latex particle dispersion. This may be accomplished by adding the prepared non-swellable latex particles and a suitable amount of a dispersant to the selected non-polar carrier, and mixing the various components. It is to be understood that any of the previously described dispersants, non-polar carriers, and mixing method(s) previously described may be used to form this example of the latex particle dispersion.

The preparation of the latex particles in water as described in the method $100_B$ may be particularly desirable, at least in part because retrieval of the latex particles from the water and dispersal of the latex particles into the desirable non-polar carrier may be readily achieved. The method $100_B$ i) avoids challenges that may otherwise be associated with the preparation of the latex particles directly in the non-polar carrier, and ii) results in an inkjet ink including the latex particles, which improve print quality (e.g., durability, scratch resistance, etc.) and print performance (e.g., reduced puddling and decap, and jetting consistency in terms of jetting velocity, trajectory, and drop weight), and the non-polar carrier, which is readily removable during the printing process.

It is to be understood that whether the preparation method of reference numeral $100_A$ or reference numeral $100_B$ is utilized, the amount of dispersant added to the non-polar carrier to form the latex particle dispersion may depend, at least in part, on the amount of retrieved or prepared non-swellable latex particles to be dispersed. For example, the dispersant concentration in the latex particle dispersion may range from about 1 wt % to about 30 wt % with respect to the latex particle content. The balance of the latex particle dispersion may be the non-polar carrier. In a specific example, about 30 g of the non-swellable latex particles are added to about 113 g of non-polar carrier and about 8 g of dispersant.

As shown at reference numeral 102 in FIG. 1, the method for forming the inkjet ink includes incorporating the latex particle dispersion into a colorant dispersion. Prior to adding the two dispersions together, the colorant dispersion may be formed by mixing the same type of non-polar carrier used in the latex particle dispersion and a dye and/or a pigment, with or without a dispersant. The total wt % of the colorant dispersion may include from about 3 wt % to about 20 wt % of the colorant, from about 1 wt % to about 30 wt % of the dispersant (when used), and a balance of the non-polar carrier.

In an example, the colorant may be pigment particles that are self-dispersible in the non-polar carrier, or may be a combination of a self-dispersible pigment and a dye. In these examples, the colorant dispersion includes the non-polar carrier and the colorant alone (i.e., without the dispersant). In another example, the colorant may be pigment particles that are non-self-dispersible in the non-polar carrier, or may be a combination of a non-self-dispersible pigment and a dye. In this example, the colorant dispersion may include one or more dispersants in addition to the non-polar carrier and the colorant. In still another example, the colorant is a dye alone, and in this example, the colorant dispersion includes the non-polar carrier and the dye without pigment(s). It is to be understood that the dispersant may be used when a dye alone is incorporated into the colorant dispersion.

When a dispersant is included in the colorant dispersion, any of the previously listed dispersants may be used. Generally, the dispersant selected for the colorant dispersion is compatible with the non-swellable latex particles in the latex particle dispersion. In some instances, the same dispersant is used in both the latex particle dispersion and the colorant dispersion so that the inkjet ink includes one dispersant. In other instances, different dispersions may be used in the latex particle dispersion and the colorant dispersion. In these other instances, the respective dispersants are selected so that they do not induce precipitation of components in the other dispersion, and thus in the final inkjet ink.

In any of the examples disclosed herein, the pigment particles may be of the same type, or may be a combination of two or more different types (e.g., primary and secondary pigments).

The pigment may be organic pigment particles or inorganic pigment particles, and each pigment particle may have any particle size (i.e., effective diameter) that allows the inkjet ink including the colorant dispersion to be printed from a piezoelectric inkjet pen. In an example, the size of the pigment particles ranges from about 50 nm to about 500 nm, and thus may be the same as or different from the size of the non-swellable latex particles.

The organic or inorganic pigment particles may be black, yellow, magenta, red, cyan, blue, green, orange, brown, or white. In some instances, the organic or inorganic pigment particles may include spot-color or specialty pigment particles. Spot-color pigments are formed from a combination of a predefined ratio of two or more primary color pigment particles. Specialty pigments may, e.g., be metallic, fluorescent and/or opalescent pigments.

An example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Suitable examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Some examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Suitable white pigments include titanium dioxide, zinc oxide, calcium carbonate, calcium oxide, clay, mica, and alumina hydrate (C.I. Pigment White 24).

Suitable metallic pigments include, but are not limited to, a metal selected from gold, silver, platinum, nickel, chromium, tin, zinc, indium, titanium, copper, aluminum, and alloys of any of these metals. These metals may be used alone or in combinations with two or more metals or metal alloys. Examples of metallic pigments include Standard RO100, Standard RO200, and DORADO PX™ 4001 (available from Eckart Effect Pigments, Wesel, Germany).

In yet another example, the pigment may be a pearlescent pigment (also known as an opalescent pigment). It is to be understood that suitable pearlescent pigments are those that tend to exhibit various colors depending on the angle of illumination and/or of viewing. Examples of pearlescent pigments include those of the PRESTIGE® series and of the DORADO PX™ series, both of which are available from Eckart Effect Pigments.

Some of the pigments disclosed herein include polymer additives as they are received from the manufacturer. These polymer additives may be included in the colorant dispersion. Additionally, some of the pigments may be polymer encapsulated pigment particles. In particular, it is desirable that the metallic pigments (or any other conductive pigments) be encapsulated with a non-conducting polymer coating so that they do not contribute to the conductivity of the final inkjet ink.

Some examples of dyes that may be used as the colorant or one of many colorants in the colorant dispersion include fluorescein, rhodamine, nigrosine, and napthol green.

Incorporating the latex particle dispersion and the colorant dispersion together may be accomplished by adding one of the dispersions to the other dispersion, or adding both dispersions to a separate container.

The amount of the latex particle dispersion and the amount of colorant dispersion used to form the inkjet ink will depend, at least in part, on the desirable composition for the inkjet ink. In an example, the inkjet ink includes the non-polar carrier in an amount ranging from about 1 wt % to about 98 wt % of the total wt % of the inkjet ink. In other examples, the amount of liquid carrier may range from about 50 wt % to about 98 wt % of the total wt % of the inkjet ink, or from about 50 wt % to about 96 wt % of the total wt % of inkjet ink. In an example, the inkjet ink includes the non-swellable latex particles in an amount ranging from about 0.5 wt % to about 50 wt % of the total wt % of inkjet ink. In other examples, the amount of the latex particles present in the inkjet ink ranges from about 1 wt % to about 10 wt % of the total wt % of inkjet ink, or from about 2 wt % to about 5 wt % of the total wt % of inkjet ink. The total amount of dispersant in the inkjet ink may be up to about 50 wt % of the total wt % of inkjet ink. In an example, the amount of colorant present in the inkjet ink (whether it be the pigment, the dye, or the combination of pigment and dye) may be up to about 20 wt % of the total wt % of inkjet ink. In other examples, the amount of the colorant ranges from about 0.5 wt % to about 15 wt %, and in yet another example, ranges from about 1 wt % to about 5 wt %.

The inkjet ink has a relatively low field conductivity, which ranges from about 90 pS/cm to about 500 pS/cm. In an example, the field conductivity of the inkjet ink ranges from about 100 pS/cm to about 300 pS/cm. In another example, the field conductivity of the inkjet ink is less than 200 pS/cm. The non-polar carrier and any dispersant used may contribute to the low field conductivity. The inkjet ink does not include a charge director or a charge adjuvant to increase the conductivity, as the relatively low field conductivity is particularly suitable for the hybrid printing technique disclosed herein.

While the preparation of the inkjet ink has been described in reference to FIG. 1, it is to be understood that the non-swellable latex particles disclosed herein may also be included in a fixing agent or a gloss enhancer that includes the non-polar carrier and dispersant, but does not include the colorant.

The inkjet ink disclosed herein may be used in any digital inkjet printing system that utilizes a piezoelectric pen, including a hybrid printing system which, as mentioned above, combines aspects of inkjet printing and transfer printing. An example of the hybrid printing system 10 is shown schematically in FIG. 2.

Figure 2:
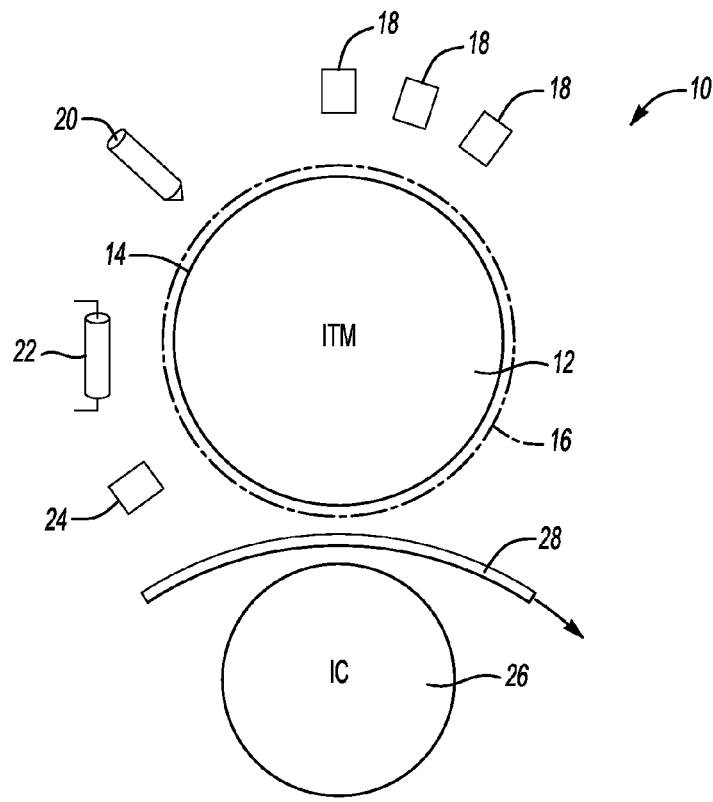
FIG. 2 is a schematic view of an example of a hybrid printing system suitable for use with an example of the inkjet ink disclosed herein.

In the example shown in FIG. 2, the hybrid printing system 10 includes an intermediate transfer medium (ITM) 12 that is configured to rotate in a first direction (as denoted by the left pointing arrow near the intermediate transfer medium 12). The intermediate transfer medium 12 has a surface 14 that may be exposed to various elements of the system 10 when the intermediate transfer medium 12 is rotated.

The intermediate transfer medium 12 may be a dielectric drum formed of an elastomeric material such as polydimethylsiloxane (PDMS), low surface energy polytetrafluoroethylene, etc. The ITM 12 should have surface energy/properties such that it facilitates desired dot size control, avoids ink drop coalescence, and facilitates efficient transfer of marking materials to substrates, such as paper and plastics.

The surface 14 of the intermediate transfer medium 12 may be uncoated or may be coated with a polymer receiving layer 16. The polymer receiving layer 16 may be deposited (by any suitable mechanism) onto the surface 14 of the intermediate transfer medium 12 prior to jetting the ink thereon, or the coated intermediate transfer medium 12 may be replaceable within the system 10. The polymer receiving layer 16 is a thermoplastic polymer having a thickness ranging from about 0.5 μm to about 1 μm. Examples of suitable thermoplastics include polyethylene, polypropylene, copolymers of methylene and ethylene and acrylic acid, etc. The polymer receiving layer 16 may protect the surface 14 of the intermediate transfer medium 12, may facilitate efficient transfer of the colorant and latex particles from the ITM 12 to the substrate, and may also enhance the fusing of the latex particles and the colorants during the printing process. Both the coated and the uncoated surface 14 of the intermediate transfer medium 12 exhibit some elastomeric properties, which enable the inkjet ink disclosed herein to initially stick to the (coated or uncoated) surface 14 when printed thereon, and facilitate transfer to the desirable substrate.

The system 10 further includes a piezoelectric pen/printhead 18 for dispensing/jetting examples of the inkjet ink directly onto the (coated or uncoated) surface 14 of the intermediate transfer medium 12 to form an image thereon. The piezoelectric pen/printhead 18 may dispense the inkjet ink therefrom at a firing frequency up to 50 kHz, with controlled dot size and accurate dot placement onto the intermediate transfer medium 12. The system 10 may include a single piezoelectric pen/printhead 18 or multiple piezoelectric pens/printheads 18. The piezoelectric pens/printheads 18 may each dispense a differently colored inkjet ink, and in some instances a piezoelectric pen/printhead 18 may be included to dispense a fixing agent or gloss enhancer.

After the ink(s) is/are printed to form a desirable image on the intermediate transfer medium 12, the intermediate transfer medium 12 rotates so that the printed image is adjacent to a charger 20. The charger 20 is operable to expose the printed image to an electric field in order to pin the colorant and the non-swellable latex particles in the image to the (coated or uncoated) surface 14 of the intermediate transfer medium 12. The electrical conductivity of the inkjet ink disclosed herein enables the colorant and the latex particles to be pinned. More particularly, electrophoretic action enables the colorant and the latex particles to stick to the (coated or uncoated) surface 14 of the intermediate transfer medium 12 during the charging process. Examples of suitable chargers 20 include a charge roller or a corona charger. In an example, the electric field used to pin the colorants and the non-swellable latex particles ranges from about 0.05 V/$\mu$m to about 5 V/$\mu$m.

Once the colorant and latex particles are pinned, the intermediate transfer medium 12 is rotated adjacent to a removal mechanism 22, which is operable to remove the non-polar carrier and the dispersant from the printed image. The removal mechanism 22 may be a contact roller, a doctor blade, or an air flow dispenser. The removal mechanism 22 leaves the pinned colorant and latex particles on the (coated or uncoated) intermediate transfer medium 12, while removing nearly all of the non-polar carrier and the dispersant. In an example, up to 95% of the non-polar carrier is removed and up to 70% of the dispersant is removed.

The intermediate transfer medium 12 is rotated so that the pinned colorant and latex particles in the printed image may be fused to form an ink layer. The system 10 includes a heat source 24 to perform the fusing. Examples of the heat source 24 include an array of ion lenses, infrared (IR) lamps, halogen heating lamps, hot air blades, etc. The heat causes the colorant particles and the latex particles to fuse together to form the ink layer. When the polymer receiving layer 16 is present, the colorant particles and the latex particles may fuse together and may also fuse to the layer 16 to form the ink layer. Suitable fusing temperatures may range from about 80° C. to about 150° C., and suitable exposure time to fusing ranges from about 10 msec to about 500 msec.

As the intermediate transfer medium 12 continues to rotate, the ink layer is transferred from the intermediate transfer medium 12 to the substrate 28, which is guided by an impression cylinder (IC) 26. The impression cylinder 26 guides the substrate 28 such that a surface of the substrate 28 contacts the ink layer on the rotating intermediate transfer medium 12. When in contact, the ink layer transfers to the substrate 28.

A processor (not shown) operatively connected to the piezoelectric pen/printhead 18 commands the piezoelectric pen/printhead 18 to deposit ink in a suitable manner to form an image on the intermediate transfer medium 12. The processor may also be operatively connected to the charger 20, the removal mechanism 22, and the heat source 24 to perform pinning, removal, and fusing in a desirable manner. The processor is capable of running suitable software routines or programs for receiving desirable digital images, and generating commands for the various components 12, 18, 20, 22, 24, 26 to reproduce digital images using the system 10.

The system 10 may be operated to deposit and pin multiple colored inkjet inks before performing removal, fusing, and ink layer transfer. For example, one color may be deposited and pinned, and then another color may be deposited and pinned, and then both of the inks in the image may be exposed to removal, fusing, and ink layer transfer. The system 10 may also be operated to perform depositing, pinning, and removal for multiple colored inks before performing fusing and ink layer transfer. For example, one color may be deposited, pinned and exposed to carrier and dispersant removal, and then another color may be deposited, pinned and exposed to carrier and dispersant removal, and then both of the inks in the image may be exposed to fusing and ink layer transfer. The system 10 may also be operated to deposit multiple colored inkjet inks before performing pinning, removal, fusing, and ink layer transfer. For example, multiple colors may be deposited simultaneously or sequentially, and then all of the deposited inks may be exposed to pinning, removal, fusing, and ink layer transfer.

The system 10 leverages the effectiveness of digital inkjet printing and the reliability of transfer printing. Examples of the inkjet inks disclosed herein are readily printable via the system 10. Furthermore, the examples of the inkjet inks include the latex particles disclosed herein, which are believed to enable a variety of ink, printing and print attributes, including ink stability, jetting reliability, controlled drop coalescence, controlled dot gain, ink coverage, rub/scratch resistance, substrate adhesion, and ink layer cohesiveness.

To further illustrate the present disclosure, an example is given herein. It is to be understood that this example is provided for illustrative purposes and is not to be construed as limiting the scope of the present disclosure.

EXAMPLE

Latex particles according to the examples disclosed herein were prepared by emulsifying styrene (57.4 parts), butyl acrylate (20 parts), methacrylonitrile (20 parts), ethylene glycol dimethacrylate (0.6 parts) and methacrylic acid (2 parts) in water containing MAXEMUL 6106.

An initiator solution was prepared by dissolving potassium persulfate (KPS) in water. Water (with a small amount of KPS) was heated to a temperature of 90° C. The above initiator solution was added to the reaction flask containing the hot water over a 50 minute period. The emulsion was simultaneously added to the reaction flask containing the hot water over the 50 minute period. The reaction mixture was maintained at a temperature of about 90° C. for an extended period of 2.5 hours and then cooled to ambient temperature. The pH of final dispersion was adjusted to 7.2 with 50% potassium hydroxide solution. The product was filtered with 200 mesh filter to obtain latex particles in water with about 20% solid content. The water was removed to obtain the latex particles.

A latex particle dispersion was prepared by mixing the latex particles (30 g) with ISOPAR® L (112.5 g). A dispersant (7.5 g of 40% Lubrizol OS#13308AQ) was added. This dispersion was jar milled with 500 g of 2 mm zirconia beads for 17 hours and then the beads were removed.

The latex particle dispersion was mixed with an ISOPAR® L-based pigment dispersion to form the inkjet ink having 5% of the pigment and 2.5% of the latex particles.

An ISOPAR® L-based pigment dispersion including 5% of the pigment and none of the latex particles was used as a comparative ink. The comparative ink also included 1% dispersant (from Lubrizol) and 1.5% heavy oil (in addition to the ISOPAR® L making up the balance of the comparative ink).

The inkjet ink including the latex particles and the comparative inkjet ink were each printed with a Dimatix Materials Printer (DMP, from Fujifilm USA) and a 10 pL printhead. FIG. 3 illustrates the drop velocity versus firing voltage data that was obtained. As illustrated, at the same firing voltage, the drop velocity was higher for the inkjet ink including the latex particles than for the comparative inkjet ink. The higher drop velocity results in higher speed printing, which is desirable for many digital printers.

It is to be understood that the ranges provided herein include the stated range and any value or sub-range within the stated range. For example, a range from about 50 nm to about 500 nm should be interpreted to include not only the explicitly recited limits of about 50 nm to about 500 nm, but also to include individual values, such as 50 nm, 100 nm, 320 nm, etc., and sub-ranges, such as from about 100 nm to about 380 nm, from about 200 nm to about 250 nm, etc. Furthermore, when "about" is utilized to describe a value, this is meant to encompass minor variations (up to +1-5%) from the stated value.

While several examples have been described in detail, it will be apparent to those skilled in the art that the disclosed examples may be modified. Therefore, the foregoing description is to be considered non-limiting.

What is claimed is:

1. An inkjet ink, comprising:
   a non-polar carrier;
   a colorant dispersed in the non-polar carrier, the colorant being chosen from a pigment, a dye, or a combination of a pigment and a dye;
   a dispersant; and
   non-swellable latex particles of a cross-linked polymer dispersed in the non-polar carrier, the cross-linked polymer consisting of: an acrylic monomer having a molecular weight less than 1000, a vinylic monomer having a molecular weight of less than 1000, or combinations thereof;
   wherein the inkjet ink exhibits a field conductivity ranging from about 90 pS/cm to about 500 pS/cm.

2. The inkjet ink as defined in claim 1, further comprising a surfactant.

3. The inkjet ink as defined in claim 1 wherein the acrylic monomer having the weight average molecular weight less than 1000 is selected from the group consisting of alkyl acrylates, alkyl methacrylates, and monomers including more than one polymerizable acrylic group.

4. The inkjet ink as defined in claim 1 wherein the acrylic monomer is selected from the group consisting of methyl methacrylate, butyl acrylate, butyl methacrylate, hexyl acrylate, hexyl methacrylate, 2-ethylhexyl acrylate, 2-ethylhexyl methacrylate, lauryl acrylate, lauryl methacrylate, stearyl methacrylate, acrylic acid, methacrylic acid, ethylene glycol dimethacrylate, pentaerythritol tri-acrylate, pentaerythritol tetra-acrylate, pentaerythritol tri-methacrylate, pentaerythritol tetra-methacrylate, acrylonitrile, methacrylonitrile, and combinations thereof.

5. The inkjet ink as defined in claim 1 wherein the vinylic monomer having the weight average molecular weight less than 1000 is selected from the group consisting of styrene, substituted styrene, and monomers including more than one polymerizable vinylic group.

6. The inkjet ink as defined in claim 5 wherein the vinylic monomer is selected from the group consisting of divinylbenzene, chloromethyl styrene, and methylstyrene.

7. The inkjet ink as defined in claim 1 wherein the non-swellable latex particles consist of the cross-linked polymer of styrene, butyl acrylate, methacrylonitrile, ethylene glycol dimethacrylate, and methacrylic acid.

8. The inkjet ink as defined in claim 1 wherein the non-swellable latex particles consist of the cross-linked polymer of styrene, butyl acrylate, ethylene glycol dimethacrylate, and methacrylic acid.

9. The inkjet ink as defined in claim 1 wherein each of the non-swellable latex particles has a glass transition temperature (Tg) ranging from about 45° C. to about 120° C.

10. The inkjet ink as defined in claim 1 wherein the non-polar carrier is selected from the group consisting of a liquid hydrocarbon, silicone oil, soy bean oil, vegetable oil, plant extracts, and combinations thereof.

11. The inkjet ink as defined in claim 1 wherein the non-swellable latex particles are present in an amount ranging from about 0.5 wt % to about 50 wt % of the inkjet ink.

12. The inkjet ink as defined in claim 1 wherein the cross-linked polymer is non-soluble in the non-polar carrier.

13. The inkjet ink as defined in claim 1 wherein the inkjet ink does not include a charge director or a charge adjuvant.

14. A printing method, comprising:
   depositing an inkjet ink directly onto an intermediate transfer medium using a piezoelectric inkjet pen, the inkjet ink including:
      a non-polar carrier;
      a colorant dispersed in the non-polar carrier, the colorant being chosen from a pigment, a dye, or a combination of a pigment and a dye;
      a dispersant; and
      non-swellable latex particles of a cross-linked polymer dispersed in the non-polar carrier, the cross-linked polymer consisting of: an acrylic monomer having a molecular weight less than 1000, a vinylic monomer having a molecular weight of less than 1000, or combinations thereof;
   exposing the deposited inkjet ink to an electric field to pin the colorant and the non-swellable latex particles of the inkjet ink to a surface of the intermediate transfer medium;
   removing the non-polar carrier from the deposited inkjet ink;
   exposing the pinned colorant and non-swellable latex particles to heat, thereby fusing the pinned colorant and non-swellable latex particles to form an ink layer; and
   transferring the ink layer to a substrate.

15. The method as defined in claim 14 wherein the intermediate transfer medium has a polymer receiving layer established thereon, and wherein the pinned colorant and non-swellable latex particles fuse with the polymer receiving layer to form the ink layer.

16. The method as defined in claim 14 wherein the depositing and the exposing to the electric field are accomplished for at least two different colored inkjet inks prior to performing the removing.

17. The method as defined in claim 14 wherein the depositing, the exposing to the electric field, and the removing are accomplished for at least two different colored inkjet inks prior to performing the exposing to the heat.

18. The method as defined in claim 14 wherein the depositing is accomplished for at least two different colored inkjet jets prior to performing the exposing to the electric field.

19. A method of making an inkjet ink, comprising:
   preparing a latex particle dispersion of:
      a non-polar carrier;
      a dispersant; and
      non-swellable latex particles of a cross-linked polymer consisting of: an acrylic monomer having a weight average molecular weight less than 1000, a vinylic monomer having a weight average molecular weight of less than 1000, or combinations thereof; and incorporating the latex particle dispersion into a colorant dispersion of:
- an other non-polar carrier of the same type as the non-polar carrier in the latex particle dispersion; and
- a colorant dispersed in the other non-polar carrier, the colorant being chosen from a pigment, a dye, or a combination of a pigment and a dye;

wherein the inkjet ink exhibits a field conductivity ranging from about 90 pS/cm to about 500 pS/cm.

20. The method as defined in claim 19, further comprising preparing the non-swellable latex particles consisting of the cross-linked polymer by:
- forming a monomer emulsion by emulsifying, in water, the acrylic monomer having the weight average molecular weight less than 1000, the vinylic monomer having the weight average molecular weight of less than 1000, or the combinations thereof;
- adding the monomer emulsion to a water-based initiator solution to form a reaction mixture;
- exposing the reaction mixture to a predetermined temperature for a predefined period of time, thereby polymerizing and cross-linking the acrylic monomer, the vinylic monomer, or the combinations thereof to form the non-swellable latex particles; and
- separating the non-swellable latex particles from the water.

\* \* \* \* \*